United States Patent
Mommsen

[15] 3,695,646
[45] Oct. 3, 1972

[54] BALL AND SOCKET PIPE JOINT WITH CLIP SPRING

[72] Inventor: Adolph C. Mommsen, Minneapolis, Minn.

[73] Assignee: Metal-Matic, Inc., Minneapolis, Minn.

[22] Filed: June 18, 1970

[21] Appl. No.: 47,284

[52] U.S. Cl. ............... 285/261, 24/211 L, 24/218, 285/166, 285/321, 284/424
[51] Int. Cl. .............................................. F16l 27/04
[58] Field of Search...... 285/160, 163, 164, 165, 166, 285/167, 261, 305, 321, 81, DIG. 22, 424; 24/218, 217, 216, 110, 201 LP, 201 S, 211 L; 85/8.8

[56] References Cited

UNITED STATES PATENTS

| 2,556,659 | 6/1951 | Patterson ............285/261 X |
| 3,032,229 | 5/1962 | Schoepe et al ...285/DIG. 22 |
| 2,417,250 | 3/1947 | Harvey .................285/164 |
| 3,315,990 | 4/1967 | Kramer .................285/321 |
| 3,314,696 | 4/1967 | Ferguson et al ........285/321 |

Primary Examiner—Dave W. Arola
Attorney—Dugger, Peterson, Johnson and Westman

[57] ABSTRACT

Curved ends of a clip spring extend through diametrically disposed slots in the socket portion of a pipe section, thereby resiliently holding the ball portion of a second pipe section.

5 Claims, 3 Drawing Figures

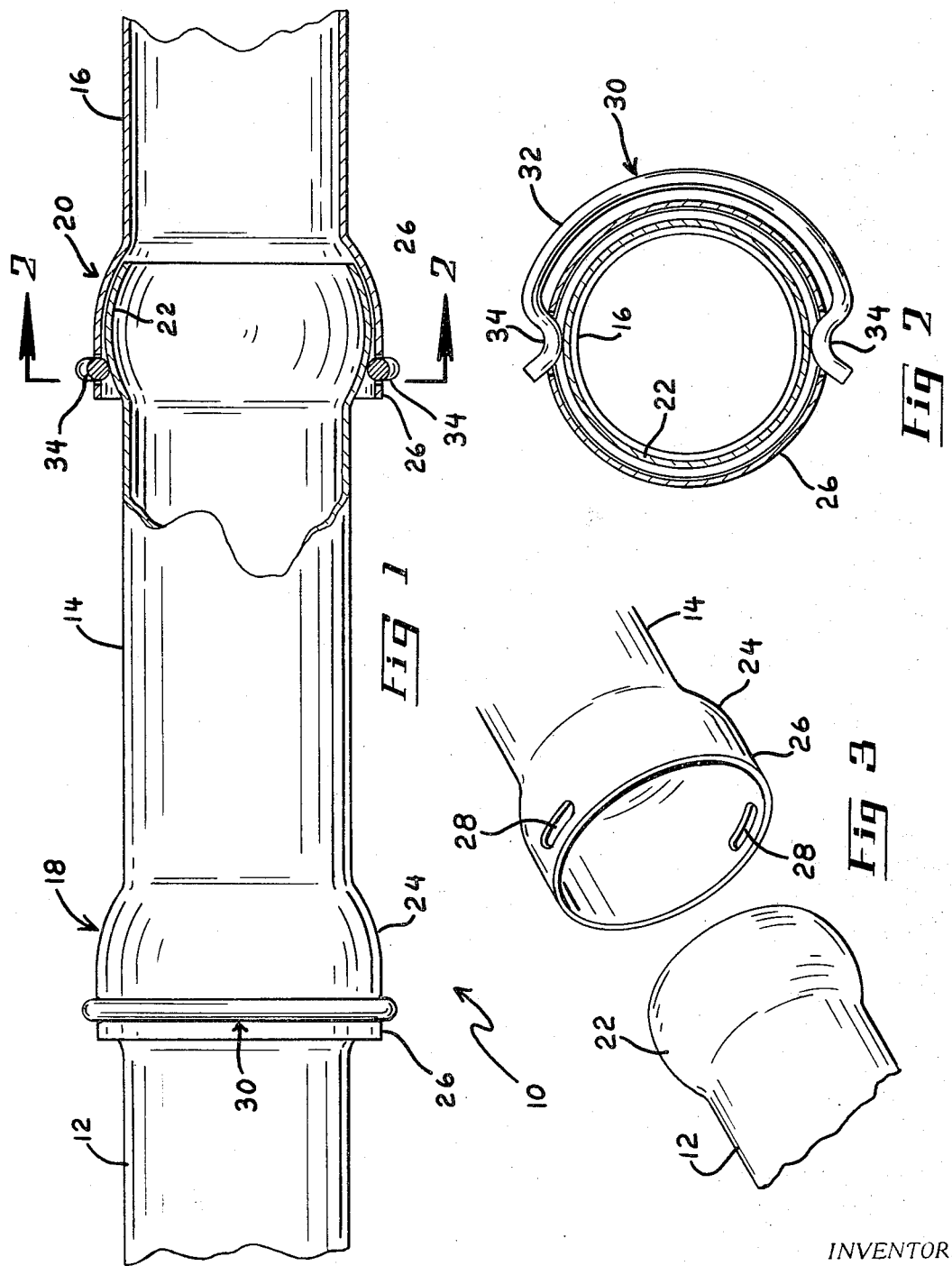

BALL AND SOCKET PIPE JOINT WITH CLIP SPRING

BACKGROUND OF THE INVENTION

1. Field of the Invention

This invention relates generally to ball and socket pipe joints, and pertains more particularly to such a joint that is resiliently retained in its mated relationship.

2. Description of the Prior Art

Ball and socket joints or couplings, of course, are not new. However, those joints with which I am familiar are quite complicated and costly to manufacture.

SUMMARY OF THE INVENTION

An important object of the present invention is to provide a tubular ball and socket joint in which the ball portion is not only resiliently held but in which it is biased against the socket portion. A more specific aim of the invention is to provide a flexible joint in which the fit can be sufficiently tight to prevent any objectionable escape of gases without resort to sealing rings or the like.

Another object of the invention is to provide a tubular ball and socket joint that can be inexpensively manufactured.

Another object is to provide a joint of the foregoing character that is comprised of only a few parts. More specifically, in addition to the ball and socket portions only a simple clip spring is utilized.

Still further, an object is to provide a ball and socket joint that is extremely easy to assemble and disassemble.

Still another object of the invention is to provide a ball and socket joint utilizing a simple clip spring in which only small portions thereof contact the ball end of one pipe section, thereby minimizing frictional forces when the pipe sections are angularly flexed with respect to each other, this being particularly advantageous where a considerable amount of vibration is encountered, such as vehicle exhaust systems.

Yet another object is to provide a joint utilizing a clip spring where the major length thereof is in a spaced relationship with the exterior of the socket, thereby obviating the need for a clip spring requiring a high-temperature alloy when my invention is employed in engine exhaust systems, such as those used on vehicles as mentioned above.

Another object of the invention is to provide a pipe joint in which the ball and socket portions can be twisted or rotated about a common axis in addition to being easily flexed into various positions.

Briefly, my invention involves the forming of a ball or spherical portion at one end of a pipe or tube. A socket or complementing spherical portion is formed at the end of a second pipe or tube, the external diameter of the ball portion being substantially the same as the internal diameter of the socket portion. The socket portion has a cylindrical extremity that is formed with a pair of diametrically disposed slots into which the curved ends of a clip spring extend so that they resiliently bear against small segments of the ball end and in this way cam or seat the ball portion firmly against the socket portion, thereby obviating the need for seals in most instances.

BRIEF DESCRIPTION OF THE DRAWING

FIG. 1 is a side elevational view showing several pipe lengths employing two joints in accordance with the teachings of the present invention, the joint at the right appearing in section;

FIG. 2 is a sectional view taken in the direction of line 2—2 of FIG. 1, and

FIG. 3 is an exploded perspective view prior to the insertion of the ball portion within the socket portion, the view being particularly advantageous in depicting the two diametrically disposed slots through which the end portions of the clip spring extend.

DESCRIPTION OF THE PREFERRED EMBODIMENT

Referring first to FIG. 1, the assemblage of several tubular pipe sections or lengths has been indicated generally by the reference numeral 10. More specifically, it will be discerned that there is a first fragmentarily depicted section 12, an intermediate section 14 and another fragmentarily depicted section 16.

Although the two joints or couplings labeled 18 and 20 are illustrated in identical form, separate reference numerals have been applied for the purpose of denoting these joints. Each joint 18, 20 includes a ball or partially spherical portion 22 at one end. The ball portion 22 on the pipe 12 is visible in FIG. 3 and the ball portion 22 on the pipe 14 is visible in FIG. 1 by reason of the sectioning. The socket portion has been identified by the reference numeral 24 in conjunction with each joint 18 and 20, the left end of the pipe 14 being so formed and the left end of the pipe 16 being so configured. It will be observed, though, that the socket portion 24 is provided with a cylindrical end 26. In this way, the ball portion 22 can be easily fitted into the socket portion 24 through the cylindrical end portion 26. Although the socket portion 24 in FIG. 1 has been drawn somewhat oversize in relation to the ball portion 22, it will be appreciated that these parts would normally be in surface contact; actually, the invention enables a good sealing action to be realized, especially when conducting gases, without resort to gaskets, O-rings or the like.

As best understood from FIG. 3, the socket 24, more specifically its cylindrical end 26, is formed with circumferentially oriented slots or openings 28. These slots or openings 28 are disposed diametrically from each other.

Playing an important role in the practicing of the invention is a resilient clip spring denoted in its entirety by the reference numeral 30. More specifically, the spring 30 includes a bight or nexus 32 having a somewhat greater radius of curvature than that of the cylindrical end 26. The spring 30 further comprises inwardly curved ends 34. The inwardly curved ends 34 provide what might be termed detents which project inwardly through the slots 28 so as to bear against the particular ball portion 22 that has been received within the associated socket portion 24 and to cam or seat the ball portion axially against the socket portion. From both FIGS. 1 and 2 it will be appreciated that the slots 28 are located so that they circumferentially overlie a reduced diameter portion of the particular ball end 22. It will also be recognized that the curved ends or detents 34 in their unflexed or normal relationship have a spacing therebetween that is less than the diameter of the ball portion 22 that they are to pressurally engage or bear against.

Owing to the lesser spacing existing between the ends 34, these ends 34 are preliminarily spread apart in order to enable their entry into the slots 28. The slots 28 are of a length so as to permit the ends or detents 34 to extend therethrough and in this way bear against the particular portions of the ball end 22 that they are to retain in place. This condition is believed evident from FIG. 2. Also the ends 34 (actually the entire spring 30) have a width or thickness only slightly less than the width of the slots 28, thereby preventing rocking of the spring 30 in a direction such as to cause contact of its bight portion 32 with the socket portion 34 when used in heated environments.

As far as assembling the joints 18, 20, and once again it will be pointed out that the two joints are identical in the exemplary situation, one has the choice of inserting the curved ends 34 of the spring 30 into the slots 28 before the ball portion 22 is inserted in the socket portion 24, the forced insertion of the ball portion 22 flexing the spring ends 34 outwardly. They contract inwardly after the mating has been fully realized. On the other hand, if the ball portion 22 is inserted into the socket portion 24 first, then the curved ends 34 can be spread apart by simply causing them to cam or ride over the cylindrical end 26 until they register with the slots 28. When this approach is taken, then when the alignment is realized, the ends 34 simply snap inwardly under their own resiliency to bear against the ball portion 22.

Inasmuch as it is planned that my invention will be rather extensively used in conjunction with snowmobile exhaust systems, it is important to note that the bight or nexus 32, this being clearly evident from FIG. 2, is in a spaced relationship with the exterior of the cylindrical end 26. The lack of any physical contact makes it such that the spring 30 can be composed of ordinary spring steel and no care need be made to select an alloy spring that is specially heat resistant. It will be appreciated that only the curved ends 34 are in direct contact with the ball portion 22 and the lack of significant surface engagement minimizes the flow of heat into the spring 30 via its ends 34. Although FIG. 1 depicts the several sections 12, 14 and 16 in axial alignment, the purpose of using two joints 18 and 20 is to allow a considerable amount of angular misalignment and/or non-parallelism. Thus, the pipe 12 can be laterally offset with respect to the pipe 16 and the intermediate pipe 14 can then extend at an angle or inclination between the two. Virtually any angular orientation can be accommodated for. In this regard, it will be understood that the pipes 12 and 16 can both be disposed in an angular relationship with respect to each other and the intermediate pipe 14 at an angle with respect to each section 12 and 16. Still further, if there is vibration of the assemblage 10 comprising the sections 12, 14 or 16, any angular displacement will be easily accommodated for with my invention.

I claim:

1. A pipe joint comprising a first tubular member having a ball portion, a second tubular member having a socket portion which receives therein said ball portion, said socket portion being formed with a pair of substantially diametrically located openings overlying outwardly curved spaced segments of the received ball portion, and a resilient clip spring having inwardly curved end portions extending through said openings into engagement with said outwardly curved spaced segments of said ball portion urging said ball portion against said socket portion and thereby provide a sealing relationship between said ball and socket portions.

2. A pipe joint in accordance with claim 1 in which said socket portion has a cylindrical end portion overlying said outwardly curved segments, said openings being located in said cylindrical end portion.

3. A pipe joint in accordance with claim 2 in which said openings constitute circumferentially arranged slots.

4. A pipe joint in accordance with claim 1 in which the intermediate portion of said clip spring extending between its ends has a curvature of a larger radius than that of said socket portion so as to provide a spaced relationship between said spring and the exterior of said cylindrical end portion.

5. A pipe joint in accordance with claim 4 in which said openings constitute elongated slots and the end portions of said spring have substantially the same thickness as the width of said slots.

* * * * *